June 3, 1924.
E. PENBERTHY
1,496,067
TOOL HOLDER AND RETAINER
Filed April 5, 1923    2 Sheets-Sheet 2
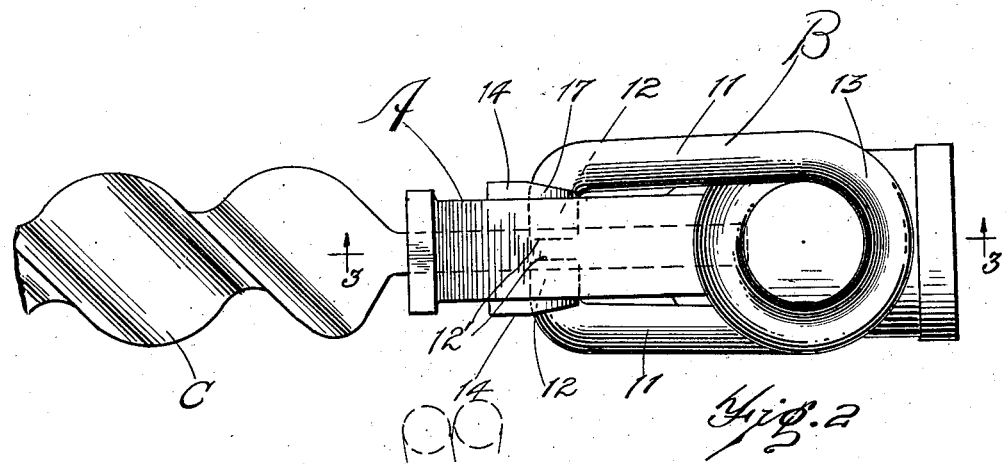
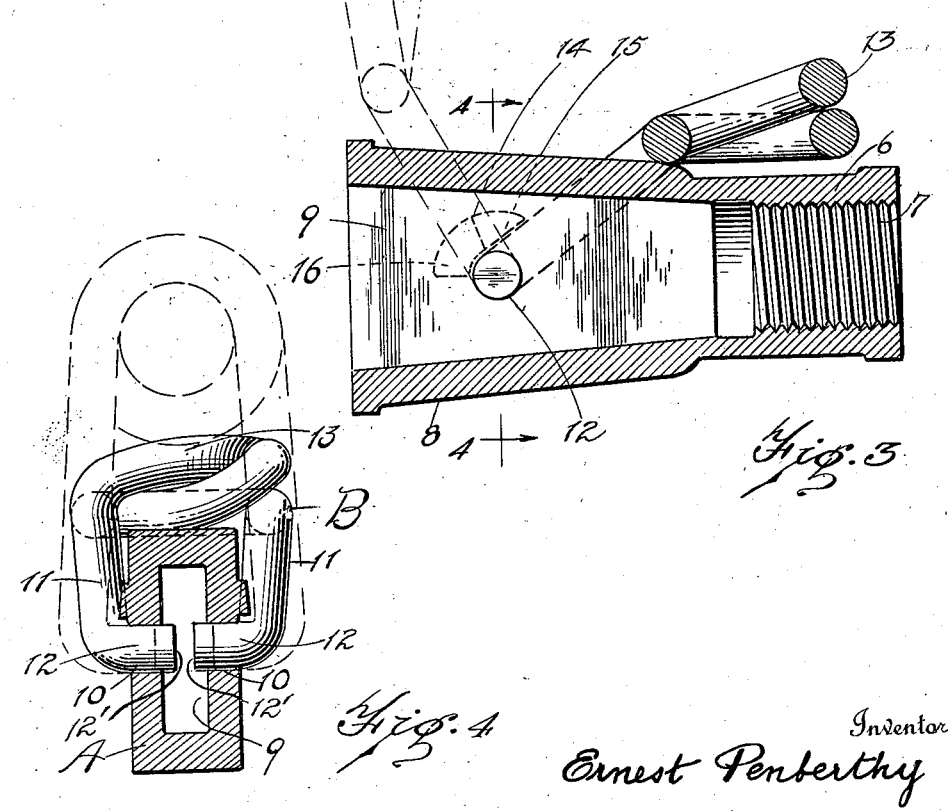
Inventor
Ernest Penberthy Patented June 3, 1924.

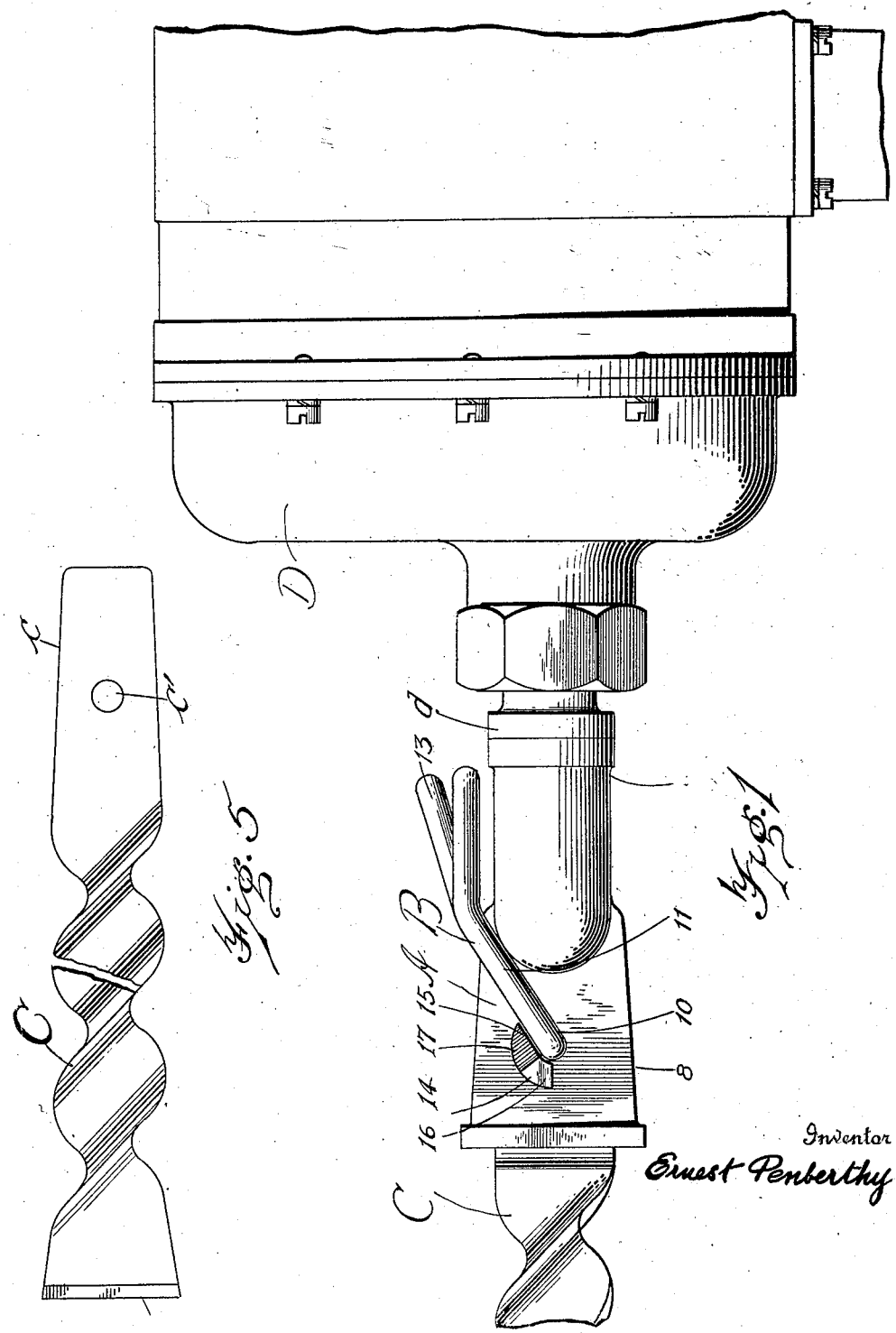

1,496,067

UNITED STATES PATENT OFFICE.

ERNEST PENBERTHY, OF DETROIT, MICHIGAN, ASSIGNOR TO CHICAGO PNEUMATIC TOOL COMPANY, OF DETROIT, MICHIGAN, A CORPORATION OF NEW JERSEY.

TOOL HOLDER AND RETAINER.

Application filed April 5, 1923. Serial No. 630,023.

*To all whom it may concern:*

Be it known that I, ERNEST PENBERTHY, a citizen of the United States of America, and resident of Detroit, in the county of Wayne and State of Michigan, have invented new and useful Improvements in Tool Holders and Retainers, of which the following is a specification.

This invention relates to means for holding and retaining interchangeable working tools. It is particularly adapted for use in combination with drilling machines for securely holding the drill bit in rigid alignment with the drill spindle. It is to be understood, however, that the inventive idea herein disclosed is not limited to such use but is susceptible of slight modifications to adapt it to other machines and uses.

Among the objects of the invention are to provide a device of the class described characterized by extreme simplicity and great efficiency, which holds the tool rigidly and securely but provides for its instant release, which facilitates the changing of working tools and consequently speeds up the work, which is economical to produce and assemble, and in general to improve prior devices of this character in the interests of more efficient and satisfactory service.

For the purpose of illustrating this invention one concrete embodiment thereof is shown in the accompanying drawings in which:

Figure 1 is a side elevational view disclosing a holder and retainer mounted upon a drilling machine and with a tool or bit in working position, the machine and tool being partly broken away;

Figure 2 is a plan view on an enlarged scale of the parts shown in Fig. 1, the drilling machine being omitted;

Figure 3 is a sectional view on the line 3—3 of Fig. 2, the tool being omitted;

Figure 4 is a sectional view on the line 4—4 of Fig. 3; and

Figure 5 is a side elevational view partly broken away of the tool or bit shown in Figs. 1 and 2.

The embodiment of the invention chosen for the purpose of illustration comprises a tool holder or chuck A having a tool retainer B pivotally mounted thereon for securing a tool or drill bit C therein, the holder as illustrated in Fig. 1 being mounted upon the spindle $d$ of a drilling machine D. The drilling machine D may be of any suitable or desired type operated by manual, mechanical, electrical, or fluid pressure means. The form of holder A shown has a substantial cylindrical end 6 provided with a threaded bore 7 for attaching the holder to the threaded end (not shown) of the spindle $d$ of the drilling machine. The opposite or tool holding end 8 of the chuck is flattened and made substantially rectangular in cross section as indicated in Fig. 4 expanding in width toward its outer end as illustrated in Fig. 3 and provided with a tapered bore 9 which serves as the socket for receiving the flat tapered shank $c$ of the tool or bit C (Fig. 5). The socket of the tool holder A is intersected by a transverse bore 10 which registers with suitable sockets or a similar bore $c'$ in the tool shank when the latter is seated in socket 9.

The retainer B has spaced arms 11 and inturned aligned ends 12 which are adapted to seat in the transverse bore 10 of the holder (Figs. 2 and 4). Thus ends 12 serve as means for pivotally mounting retainer B upon the holder A. The retainer B is by preference constructed of resilient material such as a rod of spring steel bent to form arms 11 and pivot ends 12, the connecting or intermediate portion of the retainer forming the handle 13 being looped or coiled as illustrated and adapted normally to position the ends 12 in proximity to each other. At least one of the ends or pivots 12, and by preference both, is of a length to extend its extremity 12' into engagement with a tool shank (Figs. 2 and 4), as within a socket or bore $c'$ thereof, securely to retain the tool in the chuck A. Thus the tool engaging means of the retainer are co-axial with the means for supporting the retainer on the chuck.

In order quickly to release the tool suitable means are provided for withdrawing the engaging extremity 12' or for spreading arms 11 of retainer B to withdraw the extremities of both pivots 12 from engagement with the tool shank. For this purpose one or more cam lugs or projections 14 are provided. While it is obvious that such cam lugs may be either upon the arms 11 of the retainer B or upon the sides of the holder A adjacent bore 10, they are for convenience and economy in manufacture upon the holder A and integral therewith, as illustrated in Figs. 1 to 4 inclusive, in position to be engaged by arms 11 when the retainer is swung upon its pivots 12 from the tool retaining position shown in full lines in Figs. 3 and 4 to the tool releasing position shown in broken lines in the same figures. Each lug 14 has an edge or shoulder 15 which serves as a stop for normally holding the retainer B in operative or tool retaining position, also a substantially flat surface 16 for holding the tool engaging portions 12′ of the retainer out of engagement with the tool so that both hands of the operator are free to interchange the tools. Intermediate the stop edge 15 and the surface 16 is the cam surface 17 which engages the arms 11 of the retainer and withdraws extremity 12′ sufficiently to release the tool. As illustrated, the retainer when in tool holding position is disposed with its handle 13 close against the inner or spindle engaging end 6 of the chuck and consequently does not project to any substantial extent beyond the chuck itself. Moreover making the retainer in one piece with a loop or coil forming the intermediate portion provides no projections liable to catch in the clothing of the operator when the drilling machine is in use.

The operation of the device is both simple and convenient. In order to change a tool the handle portion 13 of the retainer B is grasped and the retainer is swung on its pivots 12 to the broken line position indicated in Figs. 3 and 4. During this movement of the retainer, the arms 11 ride up upon the cam surfaces 17 on lugs 14 of holder A, withdrawing the tool engaging parts 12′ of the retainer from contact with the tool but not out of the bore 10 of the holder. The tool C can then be withdrawn and another tool or bit inserted, whereupon the retainer is moved back to its original position, the arms 11 springing in behind the stop shoulders 15 of the lugs 14 to yieldingly hold the retainer in operative position.

From the above, it will be apparent that the herein described holder and retainer is adapted greatly to facilitate work when tools have to be frequently changed, that the device can be constructed at small cost and quickly assembled and that it is simple, reliable, safe and easily operated.

I claim:

1. The combination with a tool holder or chuck of a retainer having aligned pivot ends seated in a transverse bore in said holder, at least one of said ends being of a length to engage the shank of a tool within said holder, and means for causing said end to withdraw to release the tool on swinging movement of said retainer.

2. The combination with a tool holder or chuck of a retainer having aligned pivot ends seated in a transverse bore in said holder, both ends being of a length to engage the shank of a tool within said holder, and means for causing said ends to spread to release the tool on swinging movement of said retainer.

3. The combination with a tool holding member of a tool retaining member pivotally mounted thereon by means of aligned pivots and having tool engaging means coaxial with said pivots, and means on one of said members for causing said tool engaging means to release the tool when said retaining member is swung on its pivots.

4. The combination with a tool holding member of a tool retaining member pivotally mounted thereon by means of aligned pivots and having tool engaging means coaxial with said pivots, and cam means on one of said members for engagement with the other of said members for causing said tool engaging means to release the tool when said retaining member is swung on its pivots.

5. The combination with a tool holder or chuck of a retainer having aligned pivot ends seated in a transverse bore in said holder, at least one of said ends being arranged to engage the shank of a tool within said holder, and cam means on said holder for withdrawing said last named end out of engagement with the tool shank on swinging movement of said retainer.

6. The combination with a tool holder of a retainer having spaced arms provided with aligned inturned pivots seated in a transverse bore in said holder, at least one of said pivots being adapted to engage the shank of a tool within said holder, and a cam lug on said holder in position to be engaged by the arm of said last named pivot to withdraw said pivot out of engagement with the tool shank on swinging movement of said retainer.

7. The combination with a tool holder of a retainer having spaced arms provided with aligned inturned pivots seated in a transverse bore in said holder, at least one of said pivots being adapted to engage the shank of a tool within said holder, and a cam lug on said holder in position to be engaged by the arm of said last named pivot to withdraw said pivot out of engagement with the tool shank on swinging movement of said retainer, said lug being formed with a stop shoulder normally to hold said retainer in operative position.

8. The combination with a tool holder of a retainer having spaced arms provided with aligned inturned pivots seated in a transverse bore in said holder, at least one of said pivots being adapted to engage the shank of a tool within said holder, and a lug on said holder formed with a stop shoulder for normally holding the retainer in tool retaining position, with a cam surface engaged by one arm of said retainer to withdraw the tool engaging pivot on swinging movement of said retainer, and with a substantially flat surface for maintaining said last named pivot out of engagement with the tool.

9. The combination with a tool holder of a retainer having spaced arms provided with aligned inturned pivots seated in a transverse bore in said holder, both ends of said pivots being arranged to fit into recesses in the shank of a tool within said holder, and cam lugs on said holder arranged to be engaged by said arms to spread the latter on swinging movement of the retainer thereby to release the tool, said lugs being formed with stop shoulders for normally holding the retainer in operative or tool retaining position and with flats for holding the retainer in tool releasing position.

10. The combination with a tool holder of a tool retainer comprising a member bent to form integral portions adapted to mount the retainer for swinging movement on said holder and for engaging a tool within said holder, and means utilizing the swinging movement of said retainer for releasing the tool.

11. The combination with a tool holder of a tool retainer comprising a member bent to form integral portions adapted to mount the retainer for swinging movement on said holder and for engaging a tool within said holder, and means utilizing the swinging movement of said retainer for releasing the tool, said means being arranged normally to hold said retainer in tool engaging position.

12. The combination with a tool holder of a tool retainer comprising a resilient member having tool engaging ends, said ends being constructed and arranged for pivotally mounting the retainer on said holder, and means utilizing the movement of said retainer about its pivots for releasing the tool, said means being arranged to hold said retainer either in tool engaging or in tool releasing position.

Signed by me at Detroit, Mich., this 29th day of March, 1923.

ERNEST PENBERTHY.